(12) United States Patent
Takeuchi et al.

(10) Patent No.: US 11,988,286 B2
(45) Date of Patent: May 21, 2024

(54) SEAL STRUCTURE

(71) Applicant: Kawasaki Jukogyo Kabushiki Kaisha, Kobe (JP)

(72) Inventors: Katsuhito Takeuchi, Konan (JP); Go Takano, Kakamigahara (JP); Satoshi Suzuki, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 441 days.

(21) Appl. No.: 17/185,964

(22) Filed: Feb. 26, 2021

(65) Prior Publication Data

US 2021/0239216 A1 Aug. 5, 2021

Related U.S. Application Data

(63) Continuation of application No. PCT/JP2019/033535, filed on Aug. 27, 2019.

(30) Foreign Application Priority Data

Aug. 31, 2018 (JP) ................................. 2018-163512

(51) Int. Cl.
*F16J 15/14* (2006.01)
*B21D 53/92* (2006.01)
(Continued)

(52) U.S. Cl.
CPC .............. *F16J 15/14* (2013.01); *B21D 53/92* (2013.01); *F16J 15/3272* (2013.01);
(Continued)

(58) Field of Classification Search
CPC .. B21D 53/92; B23P 2700/01; B23P 2700/12; Y10T 29/49947; Y10T 29/49957;
(Continued)

(56) References Cited

U.S. PATENT DOCUMENTS 2,576,392 A 11/1951 Downes
3,744,008 A * 7/1973 Castellani ............ H02G 3/0658
439/449

(Continued)

FOREIGN PATENT DOCUMENTS

JP 2012-192846 A 10/2012
WO 2017/001821 A1 1/2017

*Primary Examiner* — Jermie E Cozart
(74) *Attorney, Agent, or Firm* — XSENSUS LLP

(57) ABSTRACT

A seal structure is a seal structure configured to seal, by using a seal material, between a first opposing surface and a second opposing surface which are opposed to each other. A second part includes an insertion hole which is open on the second opposing surface and into which a fastener is inserted; a chamfered surface including a first end connected to an edge of the second opposing surface, the chamfered surface being inclined relative to the second opposing surface; an end surface including an edge connected to a second end of the chamfered surface, the end surface being inclined relative to the chamfered surface. A space sandwiched between the chamfered surface and the first opposing surface forms a chamfered portion accommodating the seal material protruding from between the first opposing surface and the second opposing surface.

12 Claims, 7 Drawing Sheets

(51) Int. Cl.
*F16J 15/3272* (2016.01)
*B64C 1/00* (2006.01)
(52) U.S. Cl.
CPC ....... *B23P 2700/01* (2013.01); *B23P 2700/12* (2013.01); *B64C 1/00* (2013.01); *Y10T 29/49297* (2015.01); *Y10T 29/49826* (2015.01); *Y10T 29/49947* (2015.01); *Y10T 29/49957* (2015.01); *Y10T 29/4997* (2015.01); *Y10T 29/49993* (2015.01)
(58) Field of Classification Search
CPC ......... Y10T 29/49993; Y10T 29/49297; Y10T 29/4997

See application file for complete search history.

(56) References Cited

U.S. PATENT DOCUMENTS

| 6,076,797 A | 6/2000 | Schnautz |
| 2005/0103942 A1 | 5/2005 | Abrams et al. |
| 2012/0236457 A1 | 9/2012 | Yamakoshi et al. |

\* cited by examiner

SEAL STRUCTURE

CROSS-REFERENCES TO RELATED APPLICATIONS

The present application claims priority to PCT/JP2019/033535, filed Aug. 27, 2019, which claims priority to JP 2018-163512, filed Aug. 31, 2018, the entire contents of each are incorporated herein by its reference.

TECHNICAL FIELD

The present application relates to a seal structure.

BACKGROUND ART

As a conventional seal structure, in an aircraft assembly, sealant is applied to a contact surface of a wing panel or member, and the sealant is arranged while being pushed out around the contact surface. Then, the sealant protruding around the contact surface is wiped out.

SUMMARY

A seal structure configured to seal, by using a seal material, between a first opposing surface of a first part and a second opposing surface of a second part, the first part and the second part being joined to each other by a fastener. The second part includes an insertion hole which is open on the second opposing surface and through which the fastener is inserted, a chamfered surface including a first end connected to an edge of the second opposing surface, the chamfered surface being inclined relative to the second opposing surface, and an end surface including an edge connected to a second end of the chamfered surface, the end surface being inclined relative to the chamfered surface. Further, there is a space sandwiched between the chamfered surface and the first opposing surface forms a chamfered portion accommodating the seal material protruding from between the first opposing surface and the second opposing surface. When a diameter of the insertion hole is represented by D, in a direction perpendicular to a central axis of the insertion hole, the first end of the chamfered surface is provided at a position away from the central axis of the insertion hole by 1.5D or more, and the second end of the chamfered surface is provided at such a position that a distance between the second end and the central axis of the insertion hole or between the second end and a line passing through central axes of a plurality of insertion holes is 3.0D or less.

A method of (i) joining a first part and a second part to each other by inserting a fastener into an insertion hole of the second part and (ii) sealing, by using a seal material, between a first opposing surface of the first part and a second opposing surface of the second part, the first and second opposing surfaces being opposed to each other, the second part including a chamfered surface such that a first end of the chamfered surface is connected to an edge of the second opposing surface, a second end of the chamfered surface is connected to an edge of an end surface, the chamfered surface is inclined relative to the second opposing surface and the end surface. When a diameter of the insertion hole is represented by D, in a direction perpendicular to a central axis of the insertion hole, the first end is located at a position away from the central axis of the insertion hole by 1.5D or more, and the second end is located at such a position that a distance between the second end and the central axis of the insertion hole or between the second end and a line passing through central axes of a plurality of insertion holes is 3.0D or less, the method comprising applying the seal material to one of the first opposing surface and the second opposing surface, making the first opposing surface and the second opposing surface be opposed to each other through the seal material, pressing the first opposing surface and the second opposing surface against each other and accommodating the seal material, protruding from between the first opposing surface and the second opposing surface, in a chamfered portion that is a space formed between the chamfered surface and the first opposing surface, inserting the fastener into the insertion hole, and fastening the fastener to join the first part and the second part to each other.

The application will be made clear by the following detailed explanation of preferred embodiments with reference to the attached drawings.

DESCRIPTION OF EMBODIMENTS

Figure 1:
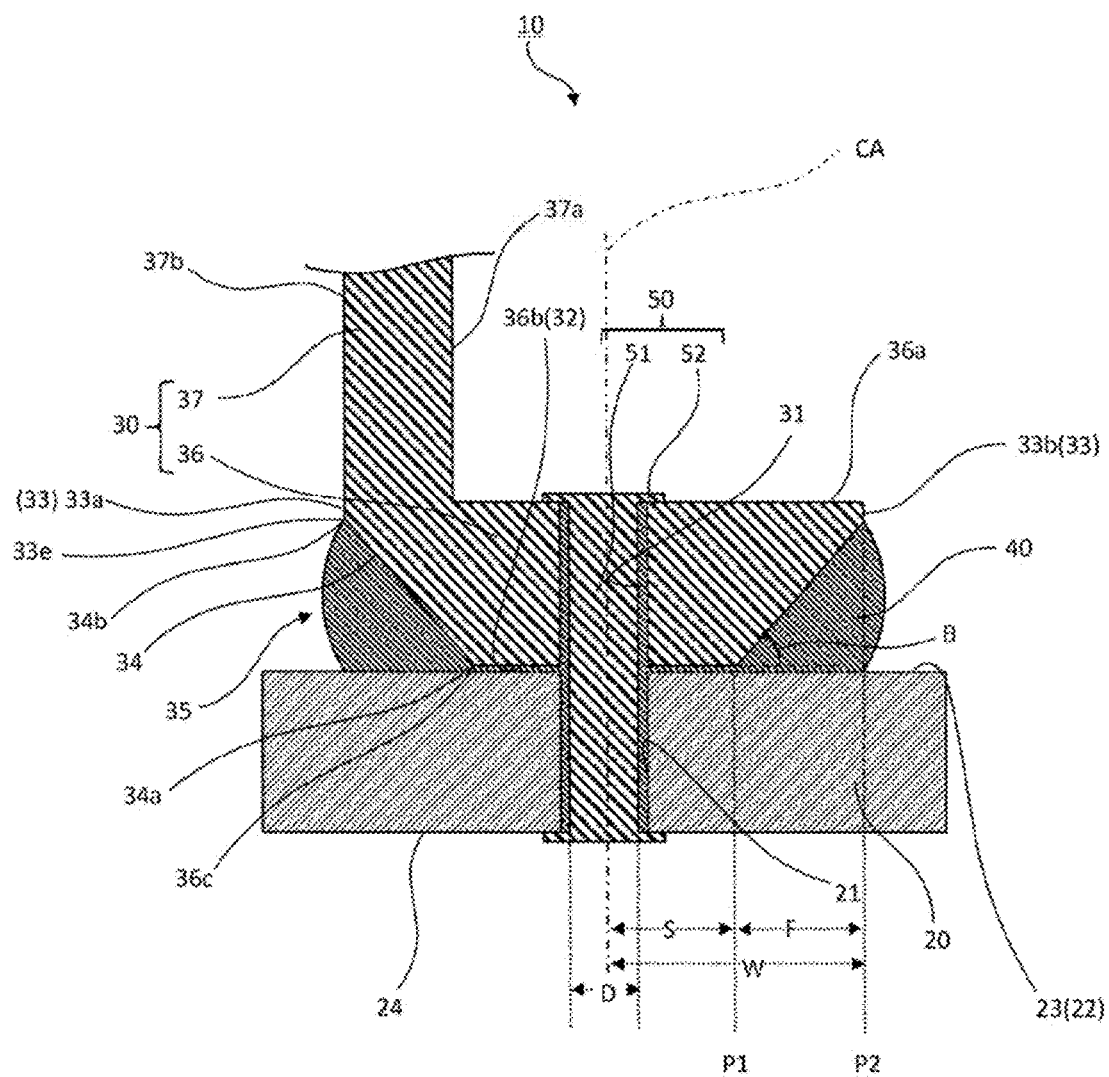
FIG. 1 is a sectional view showing a seal structure according to an embodiment.

A seal structure configured to seal, by using a seal material, between a first opposing surface of a first part and a second opposing surface of a second part, the first part and the second part being joined to each other by a fastener. The second part includes an insertion hole which is open on the second opposing surface and through which the fastener is inserted, a chamfered surface including a first end connected to an edge of the second opposing surface, the chamfered surface being inclined relative to the second opposing surface, and an end surface including an edge connected to a second end of the chamfered surface, the end surface being inclined relative to the chamfered surface. Further, there is a space sandwiched between the chamfered surface and the first opposing surface forms a chamfered portion accommodating the seal material protruding from between the first opposing surface and the second opposing surface. When a diameter of the insertion hole is represented by D, in a direction perpendicular to a central axis of the insertion hole, the first end of the chamfered surface is provided at a position away from the central axis of the insertion hole by 1.5D or more, and the second end of the chamfered surface is provided at such a position that a distance between the second end and the central axis of the insertion hole or between the second end and a line passing through central axes of a plurality of insertion holes is 3.0D or less.

In the seal structure, the seal material accommodated in the chamfered portion may project from the end surface.

In the seal structure, the chamfered surface may be covered with a film of the seal material.

In the seal structure, an angle between the chamfered surface and the first opposing surface at the chamfered portion may be 10° or more and 80° or less.

In the seal structure, the chamfered surface may be formed by at least one of a flat surface and a curved surface.

A method of (i) joining a first part and a second part to each other by inserting a fastener into an insertion hole of the second part and (ii) sealing, by using a seal material, between a first opposing surface of the first part and a second opposing surface of the second part, the first and second opposing surfaces being opposed to each other, the second part including a chamfered surface such that a first end of the chamfered surface is connected to an edge of the second opposing surface, a second end of the chamfered surface is connected to an edge of an end surface, the chamfered surface is inclined relative to the second opposing surface and the end surface. When a diameter of the insertion hole is represented by D, in a direction perpendicular to a central axis of the insertion hole, the first end is located at a position away from the central axis of the insertion hole by 1.5D or more, and the second end is located at such a position that a distance between the second end and the central axis of the insertion hole or between the second end and a line passing through central axes of a plurality of insertion holes is 3.0D or less, the method comprising: applying the seal material to one of the first opposing surface and the second opposing surface, making the first opposing surface and the second opposing surface be opposed to each other through the seal material, pressing the first opposing surface and the second opposing surface against each other and accommodating the seal material, protruding from between the first opposing surface and the second opposing surface, in a chamfered portion that is a space formed between the chamfered surface and the first opposing surface, inserting the fastener into the insertion hole, and fastening the fastener to join the first part and the second part to each other.

In the sealing method, an amount of the seal material applied to the opposing surface may be −50% or more and +50% or less of 0.016 cubic inch per square inch of the second opposing surface.

In the sealing method, an outer edge of an application range of the seal material may be provided at a position which is located on the second opposing surface and away from the first end toward the insertion hole by 0.1 inch or less or at a position which is located on the chamfered surface and away from the first end toward the second end by 0.1 inch or less.

In the sealing method, pressure at which the first opposing surface and the second opposing surface are pressed against each other may be 80 kPa or less.

In the sealing method, a time in which the first opposing surface and the second opposing surface are maintained to be pressed against each other after the seal material is applied may be two hours or less.

In the sealing method, the seal material may be made to protrude from between the first opposing surface and the second opposing surface to the chamfered portion in such a manner that the first opposing surface and the second opposing surface are moved relative to each other while the first opposing surface and the second opposing surface are pressed against each other.

In the sealing method, the one opposing surface to which the seal material is applied and which is one of the first opposing surface and the second opposing surface may be made to be inclined relative to the other of the first opposing surface and the second opposing surface, and after an inclination angle of the one opposing surface with respect to the other opposing surface is made small, the one opposing surface and the other opposing surface may be made to be opposed to each other so as to be parallel to each other.

Hereinafter, an embodiment will be specifically described with reference to the drawings. In the following description and the drawings, the same reference signs are used for the same or corresponding components, and a repetition of the same explanation is avoided.

EMBODIMENT

Seal Structure

Figure 2:
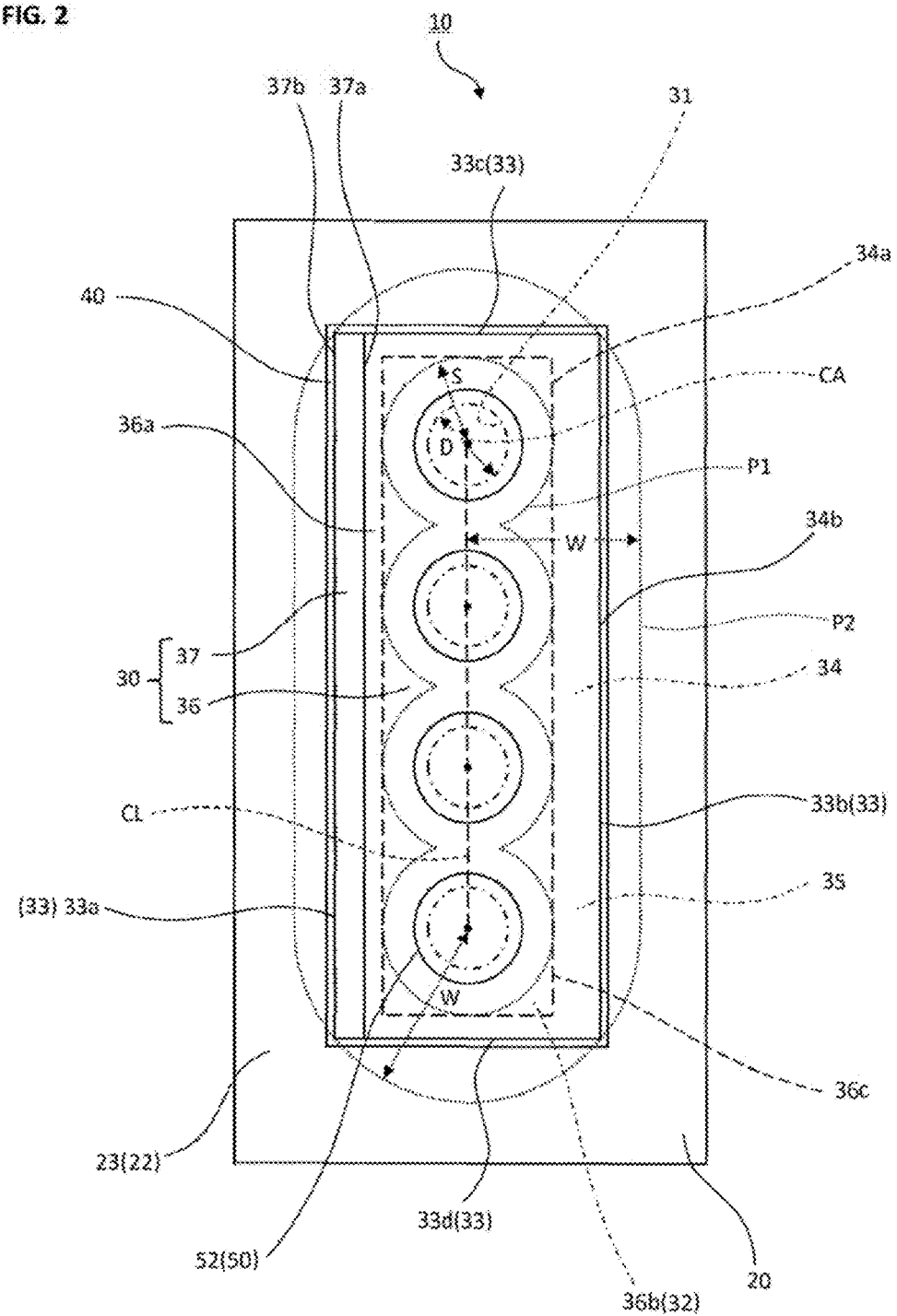
FIG. 2 is a diagram showing the seal structure of FIG. 1 when viewed from above.

As shown in FIGS. 1 and 2, a seal structure 10 according to the present embodiment is configured such that a seal material 40 seals between a first part 20 and a second part 30. For example, the first part 20 and the second part 30 are parts used in aircrafts and are joined to each other by fasteners 50 to constitute a structure (base).

Hereinafter, when viewed from the first part 20, a side where the second part 30 is located is referred to as an upper side, and its opposite side is referred to as a lower side. It should be noted that the arrangement of the first part 20 and the second part 30 is not limited to this.

The first part 20 is a base member of a body, a wing, or the like, and is made of resin or metal. For example, the resin is CFRP (Carbon Fiber Reinforced Plastics) that is a composite material of carbon fiber and resin. Moreover, for example, the metal is aluminum alloy, titanium alloy, or stainless steel.

The first part 20 includes first insertion holes 21 and a first opposing surface 22. The fasteners 50 are inserted into the first insertion holes 21. The first opposing surface 22 is opposed to the second part 30. Moreover, for example, the first part 20 has a flat plate shape and includes a first upper surface 23 and a first lower surface 24 located at an opposite side of the first upper surface 23. The first upper surface 23 is the first opposing surface 22 and is formed flat.

Each of the first insertion holes 21 has, for example, a columnar shape. Central axes of the first insertion holes 21 are perpendicular to the first opposing surface 22. Each first insertion hole 21 extends between the first opposing surface 22 and the first lower surface 24, i.e., penetrates the first part 20. The first insertion holes 21 are open on the first opposing surface 22 and the first lower surface 24.

The second part 30 is a member attached to the first part 20 and is made of a metal material, such as aluminum alloy. The second part 30 may be made of the same material as the first part 20 or may be made of a different material from the first part 20.

The second part 30 includes second insertion holes 31, a second opposing surface 32, an end surface 33, and a chamfered surface 34. A combination of the chamfered surface 34 and the end surface 33 is referred to as a side of the second part 30. The fasteners 50 are inserted into the second insertion holes 31. The second opposing surface 32 is opposed to the first opposing surface 22 of the first part 20. The end surface 33 intersects with the chamfered surface 34. The chamfered surface 34 is located between and connected to the second opposing surface 32 and the end surface 33.

For example, the second part 30 is a bracket and is formed by joining a first flat plate portion 36 and a second flat plate portion 37 to each other in an L shape. The first flat plate portion 36 includes a second upper surface 36a in addition to the second insertion holes 31, the second opposing surface 32, the end surface 33, and the chamfered surface 34.

The second opposing surface 32 is a second lower surface 36b located at an opposite side of the second upper surface 36a and is, for example, provided parallel to the second upper surface 36a. The second opposing surface 32 is, for example, formed flat along the first opposing surface 22 of the first part 20 and is smaller in area than the first opposing surface 22.

The end surface 33 intersects with the second upper surface 36a and the chamfered surface 34. In the present embodiment, the end surface 33 is perpendicular to the second upper surface 36a and the second opposing surface 32. An upper edge of the end surface 33 is connected to an outer peripheral edge of the second upper surface 36a, and a lower edge 33e of the end surface 33 is connected to the chamfered surface 34.

For example, when each of the second upper surface 36a and the second opposing surface 32 has a rectangular shape, the end surface 33 includes a first end surface 33a, a second end surface 33b, a third end surface 33c, and a fourth end surface 33d and surrounds a periphery of the second upper surface 36a and a periphery of the second opposing surface 32. The first end surface 33a and the second end surface 33b are provided parallel to each other, and the third end surface 33c and the fourth end surface 33d are provided parallel to each other.

The second insertion hole 31 has, for example, a columnar shape, and a second central axis CA of the second insertion hole 31 is perpendicular to the second opposing surface 32 and extends in an upper-lower direction. Moreover, the second insertion hole 31 extends between the second upper surface 36a and the second opposing surface 32 and penetrates the second part 30. The second insertion hole 31 is open on the second upper surface 36a and the second opposing surface 32.

The chamfered surface 34 is flat and is inclined at a constant angle with respect to the second opposing surface 32 and the end surface 33. The chamfered surface 34 is inclined so as to extend away from the second insertion hole 31 and approach the end surface 33 as it extends upward from the second opposing surface 32. When the second opposing surface 32 is made to be opposed to the first opposing surface 22 of the first part 20, an angle θ between the first opposing surface 22 and the chamfered surface 34 is, for example, 10° or more and 80° or less.

Part of the chamfered surface 34 or the entire chamfered surface 34 may be formed by a curved surface. Therefore, the chamfered surface 34 is formed by a flat surface, a curved surface, or a combination of a flat surface and a curved surface. For example, in a section parallel to the second central axis CA, the chamfered surface 34 may be curved so as to be depressed toward the second upper surface 36a from a straight line formed by connecting a lower outer peripheral edge 36c of the second opposing surface 32 and the lower edge 33e of the end surface 33 or may be curved so as to project toward an opposite side of the second upper surface 36a from the straight line.

The chamfered surface 34 includes a first end 34a and a second end 34b. The first end 34a is connected to the lower outer peripheral edge 36c, and the second end 34b is connected to the lower edge 33e. The chamfered surface 34 extends along the lower outer peripheral edge 36c and the lower edge 33e. For example, the lower outer peripheral edge 36c and the lower edge 33e are provided parallel to each other. For example, a distance F between the first end 34a and second end 34b of the chamfered surface 34 in a direction perpendicular to the second central axis CA is 0.005 inch or more and 0.5 inch or less.

In a direction perpendicular to the second central axis CA of the second insertion hole 31 having a diameter D, the first end 34a of the chamfered surface 34 is provided at a position away from the second central axis CA of the second insertion hole 31 by 1.5D or more. Therefore, the first end 34a is arranged at a position P1 that is located away from the second central axis CA by a distance S that is 1.5D or at a position that is located at an opposite side of the second central axis CA across the position P1. With this, in the second part 30, a distance between the chamfered surface 34 and the second insertion hole 31 located closest to the chamfered surface 34 is secured to be 1.0D or more. Thus, the rigidity of the second part 30 can be secured.

In a direction perpendicular to the second central axis CA, the second end 34b of the chamfered surface 34 is provided at such a position that a shortest distance between the second end 34b and the second central axis CA of the second insertion hole 31 or between the second end 34b and a line CL passing through the second central axes CA of the plurality of second insertion holes 31 is 3.0D or less. The line CL may be a straight line formed by connecting the adjacent two second central axes CA or may be a curved line, such as an approximate curve by the method of least squares, formed by smoothly connecting the plurality of second central axes CA. It should be noted that when the diameters D of the plurality of second insertion holes 31 are different from each other, the second end 34b is determined based on the diameter D of the second insertion hole 31 located closest to the second end 34b.

As above, the second end 34b is arranged at a position P2 that is located away from the second central axis CA or the straight line CL by a distance W that is 3.0D or is arranged closer to the second central axis CA than the position P2. With this, a distance between the second end 34b and the second central axis CA located closest to the second end 34b or between the second end 34b and a position of the straight line CL which position is located closest to the second end 34b becomes 3.0D or less. By securing a chamfered portion 35 formed by the chamfered surface 34, the increases in size and weight of the second part 30 can be suppressed while maintaining the rigidity of the second part 30.

A space sandwiched by the chamfered surface 34 and the first opposing surface 22 when the second opposing surface 32 and the first opposing surface 22 are made to be opposed to each other forms the chamfered portion 35 accommodating the seal material 40 which has protruded from between the first opposing surface 22 and the second opposing surface 32. The chamfered portion 35 is a cutout portion which extends along the lower outer peripheral edge 36c of the second opposing surface 32, and for example, has a triangular prism-shaped section perpendicular to the lower outer peripheral edge 36c.

The chamfered portion 35 is provided at a corner between the second opposing surface 32 and the end surface 33 and is depressed from the second opposing surface 32 and the end surface 33. Therefore, the chamfered portion 35 is open on the second opposing surface 32 and the end surface 33, and openings of the chamfered portion 35 are provided at the second opposing surface 32 and the end surface 33.

The second flat plate portion 37 includes a first side surface 37a and a second side surface 37b located at an opposite side of the first side surface 37a. The first side surface 37a extends upward from the second upper surface 36a and is, for example, arranged so as to be perpendicular to the second upper surface 36a. The second side surface 37b is continuous with the first end surface 33a of the first flat plate portion 36 and forms one flat surface together with the first end surface 33a.

The seal material 40 is made of rubber, resin, or the like, contains, for example, polysulfide, and has elasticity. The seal material 40 is filled in a space between the first opposing surface 22 and the second opposing surface 32, the chamfered portion 35, a space between the fastener 50 and an inner peripheral surface of the first insertion hole 21, and a space between the fastener 50 and an inner peripheral surface of the second insertion hole 31. An end of the seal material 40 may be located within the chamfered portion 35 so as not to project beyond the end surface 33 or may project toward an opposite side of the chamfered portion 35 beyond the end surface 33.

The fastener 50 is made of a metal, such as titanium, stainless steel, or aluminum, and includes, for example, a shaft portion 51 and a head portion 52. The shaft portion 51 has a columnar shape. The head portion 52 has a disc shape and has a larger diameter than the shaft portion 51. The head portion 52 is provided at one end of the shaft portion 51 coaxially with the shaft portion 51.

Sealing Method

Figure 3:
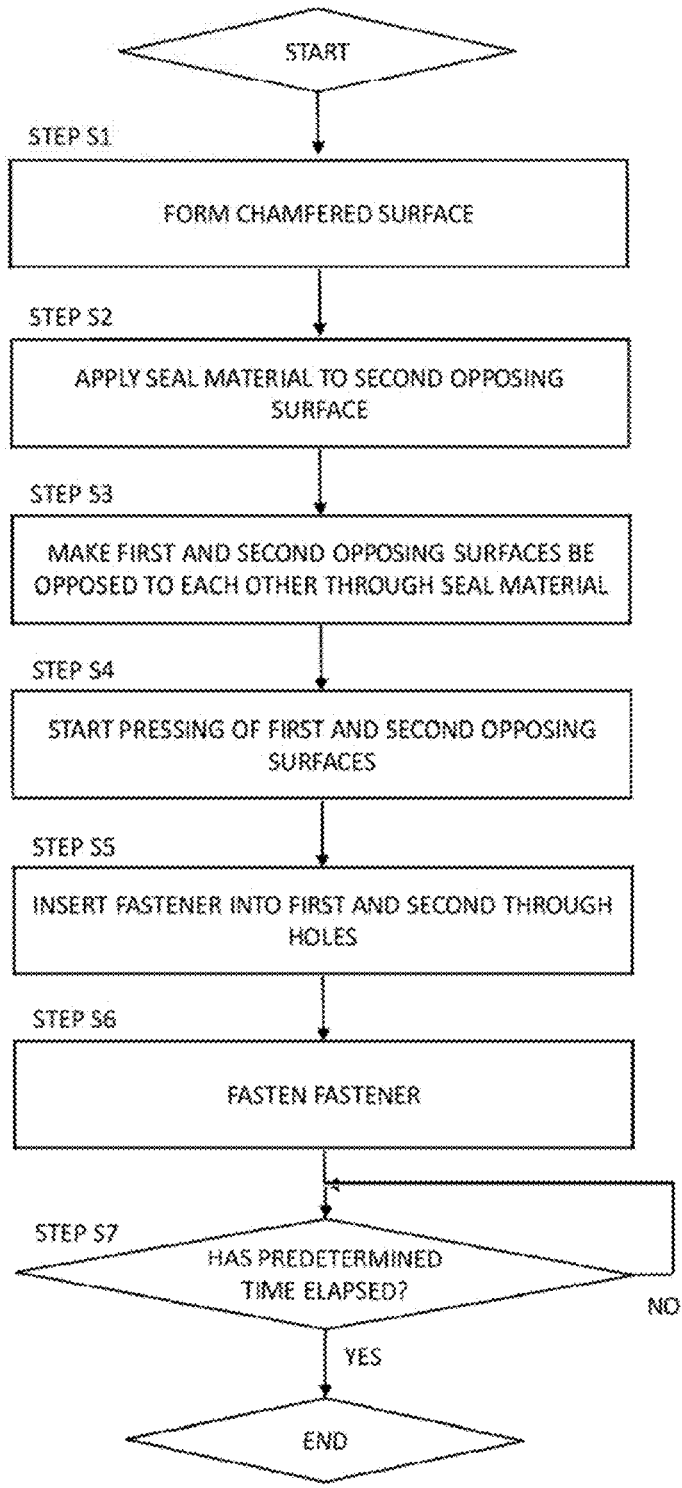
FIG. 3 is a flowchart showing one example of a sealing method using the seal structure of FIG. 1.

According to a sealing method shown in FIG. 3, first, the chamfered surface 34 is formed at the second part 30 (Step S1). The forming of the chamfered surface may be accomplished by cutting, grinding, milling, or by any other desired and appropriate technique. These techniques can be performed using computer controlled equipment, by hand, or a combination of computer controlled equipment and by hand. Further, as an alternative to or in addition to the cutting, grinding, milling and other desired and appropriate technique, the forming of the chamfered surface may be accomplished by the molding or forming of the second part 30. At this time, when the diameter of the second insertion hole 31 is represented by D, in a direction perpendicular to the second central axis CA of the second insertion hole 31, the first end 34a of the chamfered surface 34 is set to be located at a position away from the second central axis CA by 1.5D or more, and the second end 34b of the chamfered surface 34 is set to be located at such a position that a shortest distance between the second end 34b and the second central axis CA or between the second end 34b and the line CL is 3.0D or less. With this, the increases in size and weight of the second part 30 can be suppressed while securing the rigidity of the second part 30.

Next, the pasty seal material 40 having an irregular shape is applied to the second opposing surface 32 of the second part 30 with a roller or the like (Step S2). An application amount of the seal material 40 is, for example, −50% or more and +50% or less of an amount M that is 0.016 cubic inch per square inch in an area where the first opposing surface 22 and the second opposing surface 32 are opposed to each other (0.5M≤Application Amount≤1.5M).

Moreover, an outer edge of an application range of the seal material 40 is provided at a position which is located on the second opposing surface 32 and away from the first end 34a toward the second insertion hole 31 by 0.1 inch or less or at a position which is located on the chamfered surface 34 and away from the first end 34a toward the second end 34b.

To be specific, when the outer edge of the application range is located on the second opposing surface 32, the outer edge is provided on the lower outer peripheral edge 36c or between the lower outer peripheral edge 36c and a position away from the lower outer peripheral edge 36c toward the second insertion hole 31 by 0.1 inch. Therefore, the application range is equal to the second opposing surface 32 or smaller than the second opposing surface 32 and is provided within the lower outer peripheral edge 36c of the second opposing surface 32.

On the other hand, when the outer edge of the application range is located on the chamfered surface 34, the outer edge is provided on the first end 34a or between the first end 34a and a position away from the first end 34a toward the second end 34b by 0.1 inch. Therefore, the application range is larger than the second opposing surface 32 and includes the second opposing surface 32 and a range of the chamfered surface 34 which range is located close to the first end 34a.

Next, the first part 20 and the second part 30 are positioned such that the first insertion hole 21 and the second insertion hole 31 are coaxial with each other. Then, the first part 20 and the second part 30 are laminated on each other such that the first opposing surface 22 and the second opposing surface 32 are parallel to each other and opposed to each other (Step S3).

Then, the first opposing surface 22 and the second opposing surface 32 are pressed against each other (Step S4). This pressing force is, for example, 80 kPa or less. With this, the seal material 40 is filled between the first opposing surface 22 and the second upper surface 36a, is pushed out from between them, and protrudes to the chamfered portion 35, the first insertion hole 21, and the second insertion hole 31.

Moreover, the fastener 50 is inserted into the first insertion hole 21 and the second insertion hole 31 (Step S5). With this, the seal material 40 is filled between the fastener 50 and the first insertion hole 21 and between the fastener 50 and the second insertion hole 31.

Next, the fastener 50 is fastened by fastening the other end of the shaft portion 51 (Step S6). Then, a state where the first opposing surface 22 and the second opposing surface 32 are pressed against each other is maintained for a predetermined period of time (Yes in Step S7). The predetermined period of time is an elapsed time since the application of the seal material 40 and is, for example, two hours or less.

With this, the seal material 40 filled between the first opposing surface 22 and the second upper surface 36a, in the chamfered portion 35, between the fastener 50 and the inner peripheral surface of the first insertion hole 21, and between the fastener 50 and the inner peripheral surface of the second insertion hole 31 is cured.

As above, by the seal material 40 filled between the first opposing surface 22 and the second opposing surface 32, in the chamfered portion 35, between the fastener 50 and the first part 20, and between the fastener 50 and the second part 30, water-tightness is secured between the first part 20 and the second part 30, and therefore, intrusion of water, such as rain water, is prevented. Therefore, the corrosion of the first part 20, the second part 30, and the fastener 50 by water can be suppressed.

The chamfered portion 35 accommodates the seal material 40 which has protruded from between the first opposing surface 22 and the second opposing surface 32. With this, work of wiping out the protruding seal material 40 is unnecessary, and therefore, the working property can be improved.

The seal material 40 is accommodated in the chamfered portion 35 depressed at the second part 30. Therefore, even though the seal material 40 is not wiped out, the increase in the weight can be made smaller than when the chamfered portion 35 is not provided.

Moreover, it is clear that by the seal material 40 accommodated in the chamfered portion 35, the seal material 40 is filled between the first opposing surface 22 and the second opposing surface 32, and there is no gap. Therefore, inspection work is facilitated.

In addition, for example, when the seal material 40 projects outward from the chamfered portion 35 and the end surface 33, the seal material 40 of the chamfered portion 35 can be visually confirmed more easily from an outside, and therefore, the working property of the inspection can be further improved.

Modified Example 1

Figure 4:
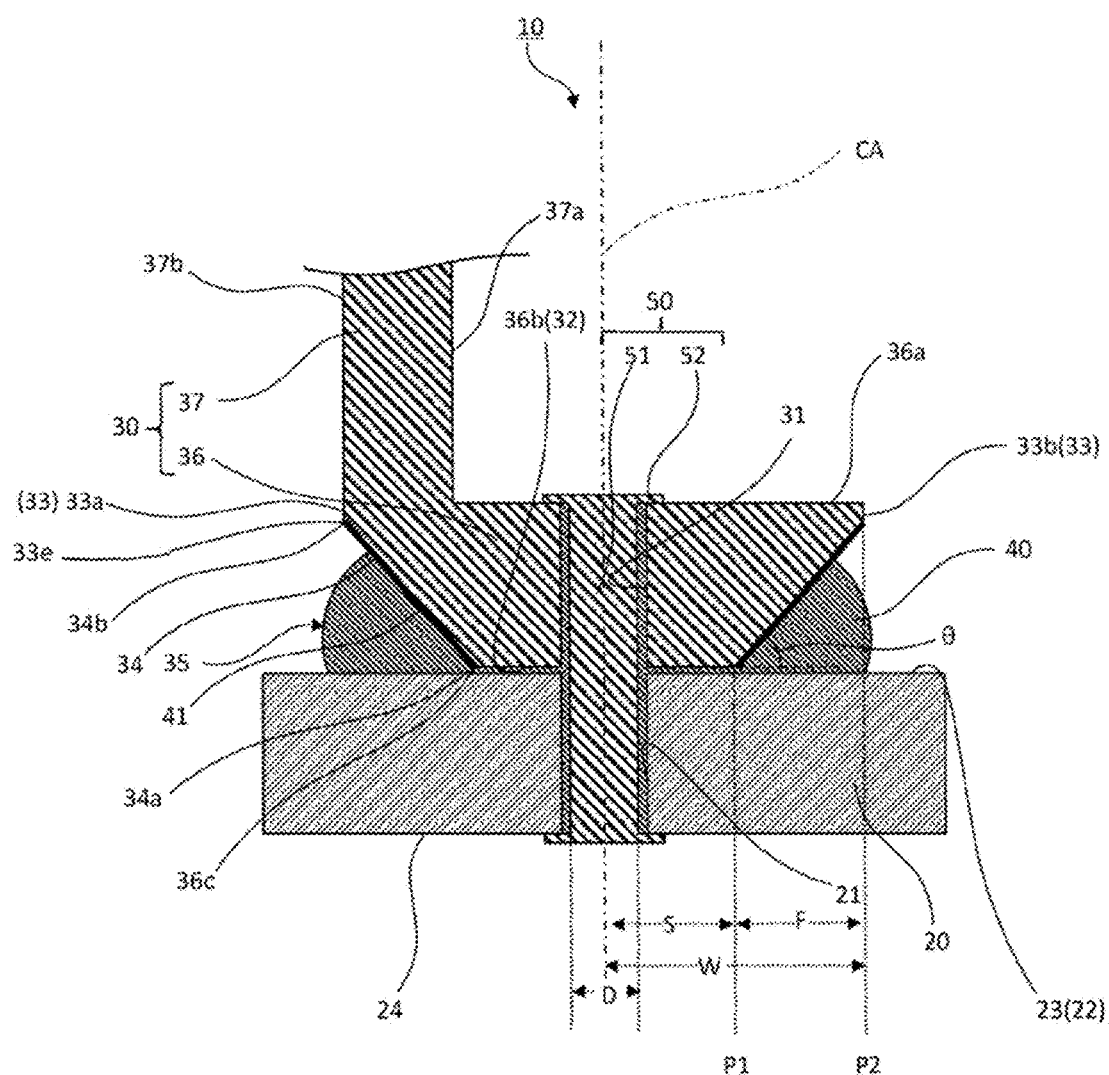
FIG. 4 is a sectional view showing the seal structure according to Modified Example 1 of the embodiment.

As shown in FIG. 4, in the seal structure 10, the chamfered surface 34 may be covered with a film 41 of the seal material 40. To be specific, when applying the seal material 40 to the second opposing surface 32, the seal material 40 is also applied to the chamfered surface 34. At this time, the application amount of the seal material 40 applied to the chamfered surface 34 is made smaller than the application amount of the seal material 40 applied to the second opposing surface 32. With this, the film 41 of the seal material 40 is formed on the entire chamfered surface 34.

Contact of water with the chamfered surface 34 is prevented by the film 41 of the seal material 40. Therefore, even when the first part 20 and the second part 30 are made of different types of metal, the occurrence of electrolytic corrosion of the first part 20 and the second part 30 through water can be reduced.

Modified Example 2

Figure 5:
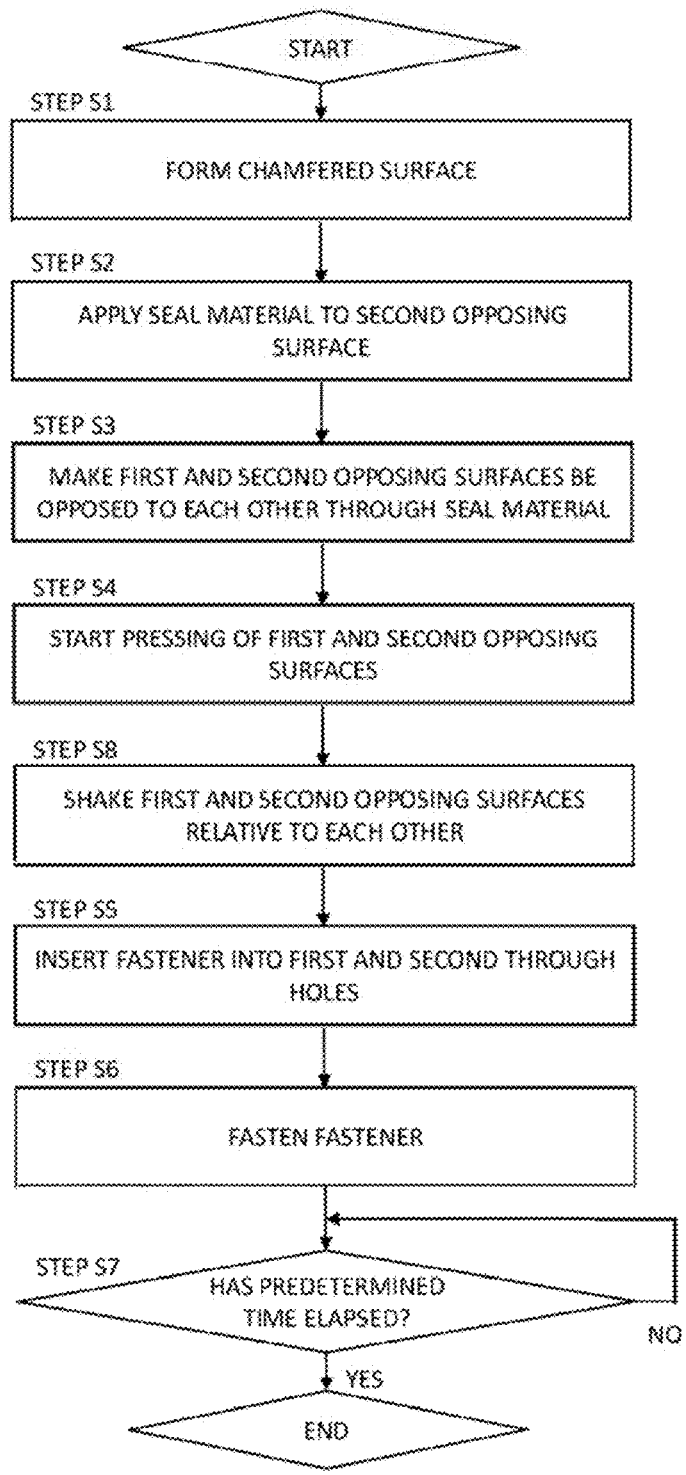
FIG. 5 is a flowchart showing one example of the sealing method using the seal structure according to Modified Example 2 of the embodiment.

In the sealing method, in a state where the first opposing surface 22 and the second opposing surface 32 are pressed against each other, the first part 20 and the second part 30 may be moved relative to each other. For example, as shown in a flowchart of FIG. 5, Step S8 is performed between Steps S4 and S5 of a flowchart shown in FIG. 3.

Specifically, the chamfered surface 34 is formed at the second part 30 (Step S1), and the seal material 40 is applied to the second opposing surface 32 of the second part 30 (Step S2). The first part 20 and the second part 30 are laminated on each other such that the first opposing surface 22 and the second opposing surface 32 are opposed to each other (Step S3).

Then, for example, the second opposing surface 32 is pressed against the first opposing surface 22 at a pressure of 80 kPa or less (Step S4). In this pressed state, the second opposing surface 32 is periodically displaced relative to the first opposing surface 22 so as to vibrate, is moved relative to the first opposing surface 22, and is made to shake (Step S8). With this, the seal material 40 between the first opposing surface 22 and the second opposing surface 32 easily spreads and can be easily pushed out to the chamfered portion 35 and the like.

Next, the fastener 50 is inserted into the first insertion hole 21 and the second insertion hole 31 (Step S5) and is fastened (Step S6). Then, a state where the first opposing surface 22 and the second opposing surface 32 are pressed against each other is maintained until the elapsed time since the application of the seal material 40 reaches the predetermined period of time (Yes in Step S7).

With this, the working property can be improved while suppressing the corrosion, the decrease in rigidity, and the increase in weight of the seal structure 10. It should be noted that in Modified Example 2, as with Modified Example 1, the chamfered surface 34 may be covered with the film 41 of the seal material 40.

Modified Example 3

Figure 6:
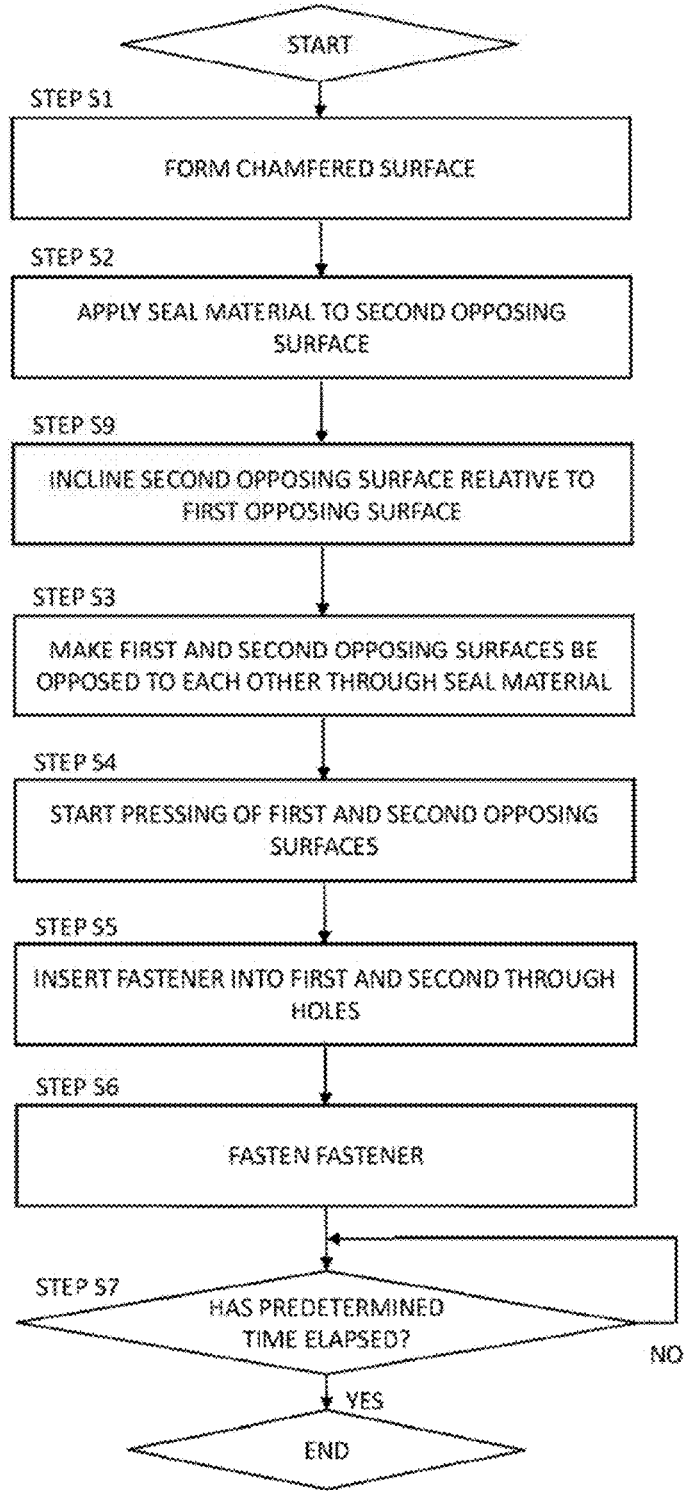
FIG. 6 is a flowchart showing one example of the sealing method using the seal structure according to Modified Example 3 of the embodiment.

In the sealing method, when the first opposing surface 22 and the second opposing surface 32 are made to be opposed to each other, the first opposing surface 22 and the second opposing surface 32 may be inclined relative to each other. For example, as shown in a flowchart in FIG. 6, Step S9 is performed before Step S3 of the flowchart shown in FIG. 3.

Specifically, the chamfered surface 34 is formed at the second part 30 (Step S1), and the seal material 40 is applied to the second opposing surface 32 of the second part 30 (Step S2). Then, the second opposing surface 32 is made to be inclined relative to the first opposing surface 22 (Step S9). When a direction parallel to the first opposing surface 22 is regarded as 0°, the inclination angle of the second opposing surface 32 is, for example, −15° or more and +15° or less.

For example, the second opposing surface 32 is made to be inclined relative to the first opposing surface 22 toward one side (for example, at a negative inclination angle) such that the first end surface 33a is located higher than the second end surface 33b. Then, the second opposing surface 32 is inclined such that the inclination angle becomes 0°.

Or, the second opposing surface 32 is made to be inclined toward the other side (for example, at a positive inclination angle) such that the first end surface 33a is located lower than the second end surface 33b. Then, the second opposing surface 32 is inclined such that inclination angle becomes 0.

This is performed once or plural times. With this, the seal material 40 between the first opposing surface 22 and the second upper surface 36a easily spreads and can be easily pushed out to the chamfered portion 35 and the like.

Next, the first opposing surface 22 and the second opposing surface 32 are made to be opposed to each other so as to become parallel to each other (Step S3). Then, the second opposing surface 32 is pressed against the first opposing surface 22 (Step S4), and the fastener 50 is inserted into the first insertion hole 21 and the second insertion hole 31 (Step S5).

Then, the fastener 50 is fastened (Step S6), and a state where the first opposing surface 22 and the second opposing surface 32 are pressed against each other is maintained until the elapsed time since the application of the seal material 40 reaches the predetermined period of time (Yes in Step S7).

With this, the working property can be improved while suppressing the corrosion, the decrease in rigidity, and the increase in weight of the seal structure 10. It should be noted that in Modified Example 3, as with Modified Example 1, the chamfered surface 34 may be covered with the film 41 of the seal material 40. Moreover, in Modified Example 3, as with Modified Example 2, in a state where the first opposing surface 22 and the second opposing surface 32 are pressed against each other, the first part 20 and the second part 30 may be moved relative to each other.

Modified Example 4

Figure 7:
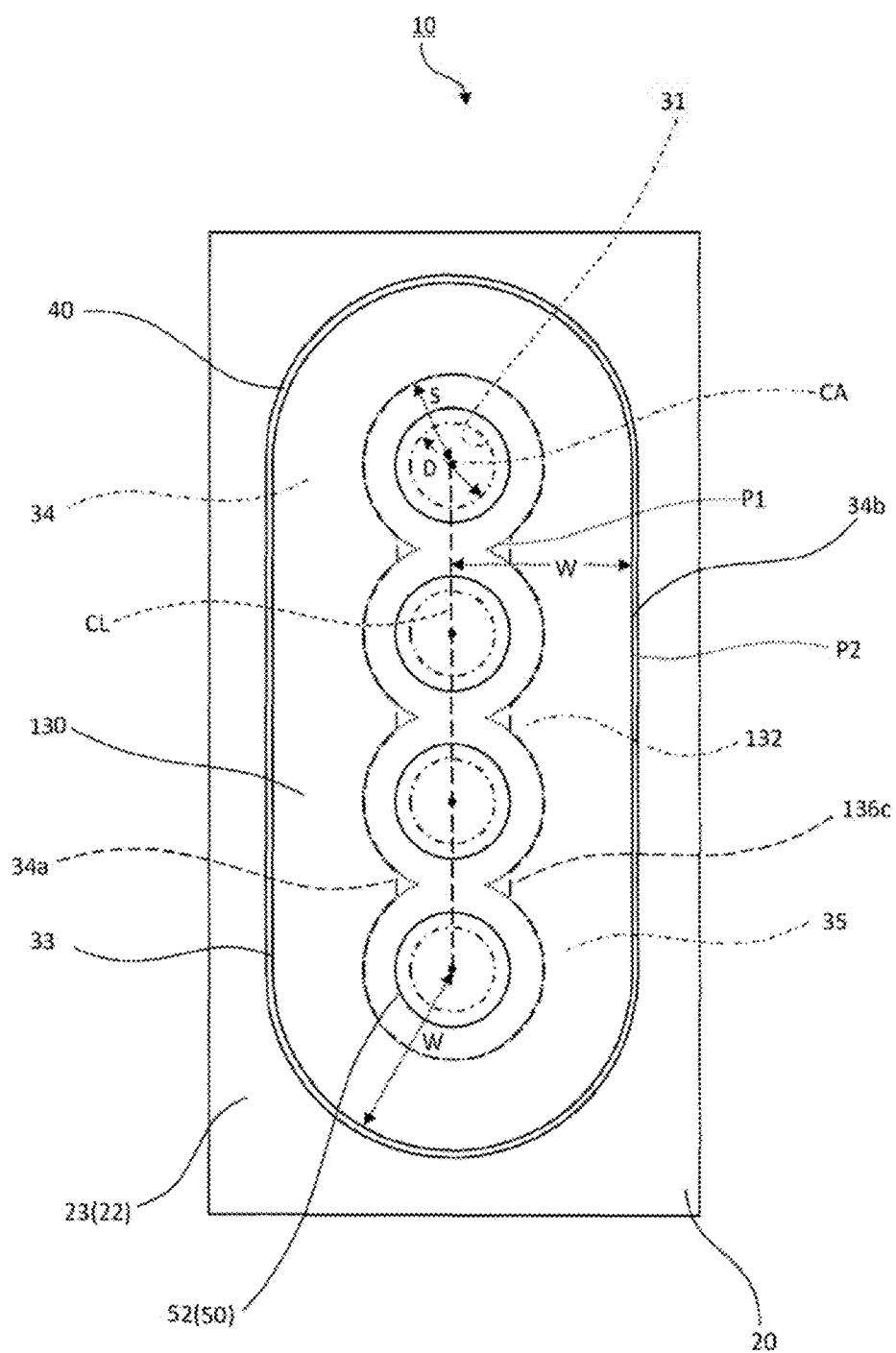
FIG. 7 is a diagram showing the seal structure according to Modified Example 4 of the embodiment when viewed from above.

As shown in FIG. 7, a lower outer peripheral edge 136c of a second opposing surface 132 of a second part 130 of the seal structure 10 may be formed in a curved shape. Even in this case, the chamfered surface 34 including the first end 34a connected to the lower outer peripheral edge 136c is provided along the lower outer peripheral edge 136c.

In a direction perpendicular to the second central axis CA of the second insertion hole 31, the first end 34a of the chamfered surface 34 is provided at a position away from the second central axis CA of the second insertion hole 31 having the diameter D by 1.5D or more. Moreover, the second end 34*b* of the chamfered surface 34 is provided at such a position that in the direction perpendicular to the second central axis CA, a shortest distance between the second end 34*b* and the second central axis CA of the second insertion hole 31 or between the second end 34*b* and the line CL passing through the second central axes CA of the plurality of second insertion holes 31 is 3.0D or less.

With this, the working property can be improved while suppressing the corrosion, the decrease in rigidity, and the increase in weight of the seal structure 10. It should be noted that in Modified Example 4, as with Modified Example 1, the chamfered surface 34 may be covered with the film 41 of the seal material 40. Moreover, in Modified Example 4, as with Modified Example 2, in a state where the first opposing surface 22 and the second opposing surface 32 are pressed against each other, the first part 20 and the second part 130 may be moved relative to each other. In Modified Example 3, as with Modified Example 2, when the first opposing surface 22 and the second opposing surface 132 are made to be opposed to each other, the first opposing surface 22 and the second opposing surface 132 may be inclined relative to each other.

Other Modified Examples

According to the above embodiment and Modified Examples 1, 3, and 4, in Steps S4 and S5, the second opposing surface 32 is pressed against the first opposing surface 22, and the fastener 50 is then inserted into the first insertion hole 21 and the second insertion hole 31. However, the second opposing surface 32 may be pressed against the first opposing surface 22 after the fastener 50 is inserted into the first insertion hole 21 and the second insertion hole 31.

According to the above embodiment and all the modified examples, in Step S2, the seal material 40 is applied to the second opposing surface 32, 132 of the second part 130. However, the seal material 40 may be applied to a range of the first opposing surface 22 which range faces the second opposing surface 32, 132.

According to the above embodiment and all the modified examples, the inclination angle of the chamfered surface 34 with respect to the second opposing surface 32, 132 is constant along the lower outer peripheral edge 36*c*, 136*c* of the chamfered surface 34. However, the inclination angle of the chamfered surface 34 with respect to the second opposing surface 132 may vary along the first end 34*a* of the chamfered surface 34. For example, as in Modified Example 3, when the first opposing surface 22 is pressed against the second opposing surface 132 after the second opposing surface 132 is made to be inclined relative to the first opposing surface 22, the inclination angle may be changed in accordance with a direction in which the second opposing surface 132 is made to be inclined.

The above embodiments may be combined with each other as long as they do not exclude each other. From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The seal structure of the present application is useful as, for example, a seal structure capable of improving a working property while suppressing corrosion, a decrease in rigidity, and an increase in weight.

If desired, the application is configured as described above and has an effect of being able to provide a seal structure capable of improving a working property while suppressing corrosion, a decrease in rigidity, and an increase in weight.

According to an optional aspect of the application, the chamfered surface may eliminate a wiping of sealant protruding from between the wing panel. However, it is also possible to perform a wiping of the sealant, if desired.

The present application may, if desired, improve a working property while suppressing corrosion, a decrease in rigidity, and an increase in weight.

Features of the Seal

A seal structure configured to seal, by using a seal material, between a first opposing surface of a first part and a second opposing surface of a second part, the first part and the second part being joined to each other by a fastener. The second part includes an insertion hole which is open on the second opposing surface and through which the fastener is inserted, a chamfered surface including a first end connected to an edge of the second opposing surface, the chamfered surface being inclined relative to the second opposing surface, and an end surface including an edge connected to a second end of the chamfered surface, the end surface being inclined relative to the chamfered surface. Further, there is a space sandwiched between the chamfered surface and the first opposing surface forms a chamfered portion accommodating the seal material protruding from between the first opposing surface and the second opposing surface. When a diameter of the insertion hole is represented by D, in a direction perpendicular to a central axis of the insertion hole, the first end of the chamfered surface is provided at a position away from the central axis of the insertion hole by 1.5D or more, and the second end of the chamfered surface is provided at such a position that a distance between the second end and the central axis of the insertion hole or between the second end and a line passing through central axes of a plurality of insertion holes is 3.0D or less.

A method of (i) joining a first part and a second part to each other by inserting a fastener into an insertion hole of the second part and (ii) sealing, by using a seal material, between a first opposing surface of the first part and a second opposing surface of the second part, the first and second opposing surfaces being opposed to each other, the second part including a chamfered surface such that a first end of the chamfered surface is connected to an edge of the second opposing surface, a second end of the chamfered surface is connected to an edge of an end surface, the chamfered surface is inclined relative to the second opposing surface and the end surface. When a diameter of the insertion hole is represented by D, in a direction perpendicular to a central axis of the insertion hole, the first end is located at a position away from the central axis of the insertion hole by 1.5D or more, and the second end is located at such a position that a distance between the second end and the central axis of the insertion hole or between the second end and a line passing through central axes of a plurality of insertion holes is 3.0D or less, the method comprising: applying the seal material to one of the first opposing surface and the second opposing surface, making the first opposing surface and the second opposing surface be opposed to each other through the seal material, pressing the first opposing surface and the second opposing surface against each other and accommodating the seal material, protruding from between the first opposing surface and the second opposing surface, in a chamfered portion that is a space formed between the chamfered surface and the first opposing surface, inserting the fastener into the insertion hole, and fastening the fastener to join the first part and the second part to each other.

REFERENCE SIGNS LIST 10 seal structure
20 first part
21 first insertion hole
22 first opposing surface
23 first upper surface (first opposing surface)
24 first lower surface
30 second part
31 second insertion hole
32 second opposing surface
33 end surface
33a first end surface (end surface)
33b second end surface (end surface)
33c third end surface (end surface)
33d fourth end surface (end surface)
33e lower edge (edge)
34 chamfered surface
34a first end
34b second end
35 chamfered portion
36 first flat plate portion
36a second upper surface
36b second lower surface (second opposing surface)
36c lower outer peripheral edge (edge)
37 second flat plate portion
37a first side surface
37b second side surface
40 seal material
41 film
50 fastener
51 shaft portion
52 head portion
130 second part
132 second opposing surface
136c lower outer peripheral edge (edge)

The invention claimed is:

1. A seal structure configured to seal, by using a seal material, between a first opposing surface of a first part and a second opposing surface of a second part, the first part and the second part being joined to each other by a fastener, wherein:
the second part includes
an insertion hole which is open on the second opposing surface and through which the fastener is inserted,
a chamfered surface including a first end connected to an edge of the second opposing surface, the chamfered surface being inclined relative to the second opposing surface, and
an end surface including an edge connected to a second end of the chamfered surface, the end surface being inclined relative to the chamfered surface;
a space sandwiched between the chamfered surface and the first opposing surface forms a chamfered portion accommodating the seal material protruding from between the first opposing surface and the second opposing surface; and
when a diameter of the insertion hole is represented by D, in a direction perpendicular to a central axis of the insertion hole, the first end of the chamfered surface is provided at a position away from the central axis of the insertion hole by one and a half times the diameter D or more, and the second end of the chamfered surface is provided at such a position that a distance between the second end and the central axis of the insertion hole or between the second end and a line passing through central axes of a plurality of insertion holes is three times the diameter D or less.

2. The seal structure according to claim 1, wherein the seal material accommodated in the chamfered portion projects from the end surface.

3. The seal structure according to claim 1, wherein the chamfered surface is covered with a film of the seal material.

4. The seal structure according to claim 1, wherein an angle between the chamfered surface and the first opposing surface is in a range between and including 10° and 80°.

5. The seal structure according to claim 1, wherein the chamfered surface is formed by at least one of a flat surface and a curved surface.

6. A method of (i) joining a first part and a second part to each other by inserting a fastener into an insertion hole of the second part and (ii) sealing, by using a seal material, between a first opposing surface of the first part and a second opposing surface of the second part, the first and second opposing surfaces being opposed to each other, the second part including
a chamfered surface such that
a first end of the chamfered surface is connected to an edge of the second opposing surface,
a second end of the chamfered surface is connected to an edge of an end surface,
the chamfered surface is inclined relative to the second opposing surface and the end surface, and
when a diameter of the insertion hole is represented by D, in a direction perpendicular to a central axis of the insertion hole, the first end is located at a position away from the central axis of the insertion hole by one and a half times the diameter D or more, and the second end is located at such a position that a distance between the second end and the central axis of the insertion hole or between the second end and a line passing through central axes of a plurality of insertion holes is three times the diameter D or less, the method comprising:
applying the seal material to one of the first opposing surface and the second opposing surface;
making the first opposing surface and the second opposing surface be opposed to each other through the seal material;
pressing the first opposing surface and the second opposing surface against each other and accommodating the seal material, protruding from between the first opposing surface and the second opposing surface, in a chamfered portion that is a space formed between the chamfered surface and the first opposing surface;
inserting the fastener into the insertion hole; and
fastening the fastener to join the first part and the second part to each other.

7. The method according to claim 6, wherein an amount of the seal material applied to the opposing surface is in a range of plus or minus 50% of 0.016 cubic inch per square inch of the second opposing surface.

8. The method according to claim 6, wherein an outer edge of an application range of the seal material is provided at a position which is located on the second opposing surface and away from the first end toward the insertion hole by 0.1 inch or less or at a position which is located on the chamfered surface and away from the first end toward the second end by 0.1 inch or less.

9. The method according to claim 6, wherein pressure at which the first opposing surface and the second opposing surface are pressed against each other is 80 kPa or less.

10. The method according to claim 6, wherein a time in which the first opposing surface and the second opposing surface are maintained to be pressed against each other after the seal material is applied to the opposing surface is two hours or less.

11. The method according to claim 6, wherein the seal material is made to protrude from between the first opposing surface and the second opposing surface to the chamfered portion in such a manner that the first opposing surface and the second opposing surface are moved relative to each other while the first opposing surface and the second opposing surface are pressed against each other.

12. The method according to claim 6, wherein:
- an opposing surface to which the seal material is applied is one of the first opposing surface and the second opposing surface which is made to be inclined relative to the other of the first opposing surface and the second opposing surface; and
- after an inclination angle of the opposing surface with respect to an other opposing surface is made small, the opposing surface and the other opposing surface are made to be opposed to each other so as to be parallel to each other.

* * * * *